May 18, 1954     A. A. BUREAU ET AL     2,678,668
REEL-LAGGING APPARATUS
Filed July 23, 1952     2 Sheets-Sheet 1
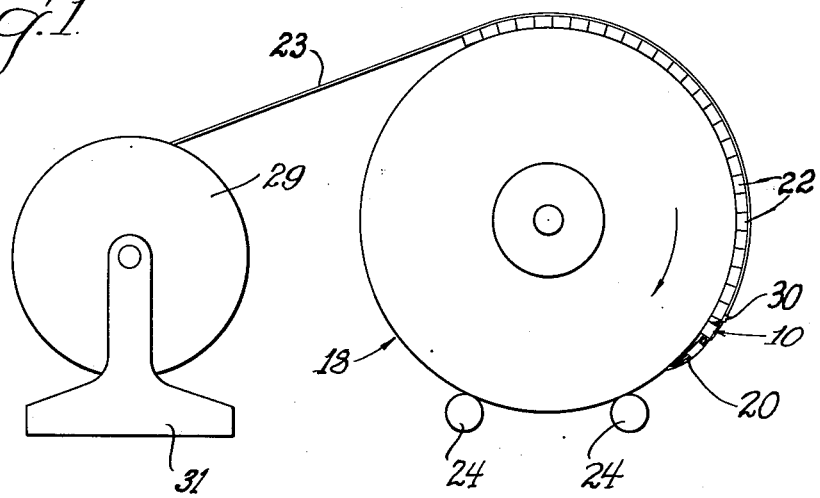
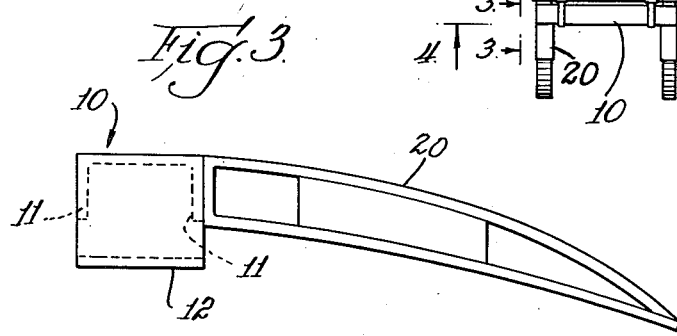
INVENTOR.
A. A. Bureau and F. E. Kimmel
BY E. F. Kane
Atty.

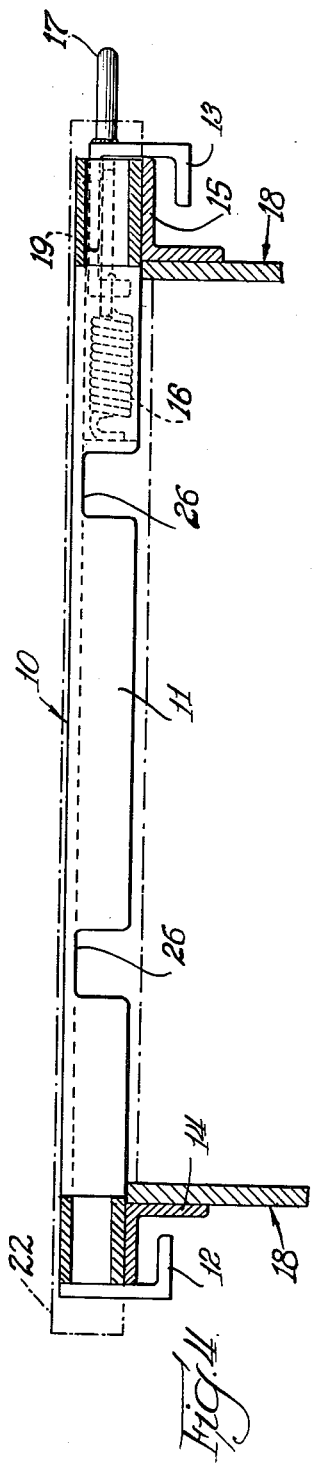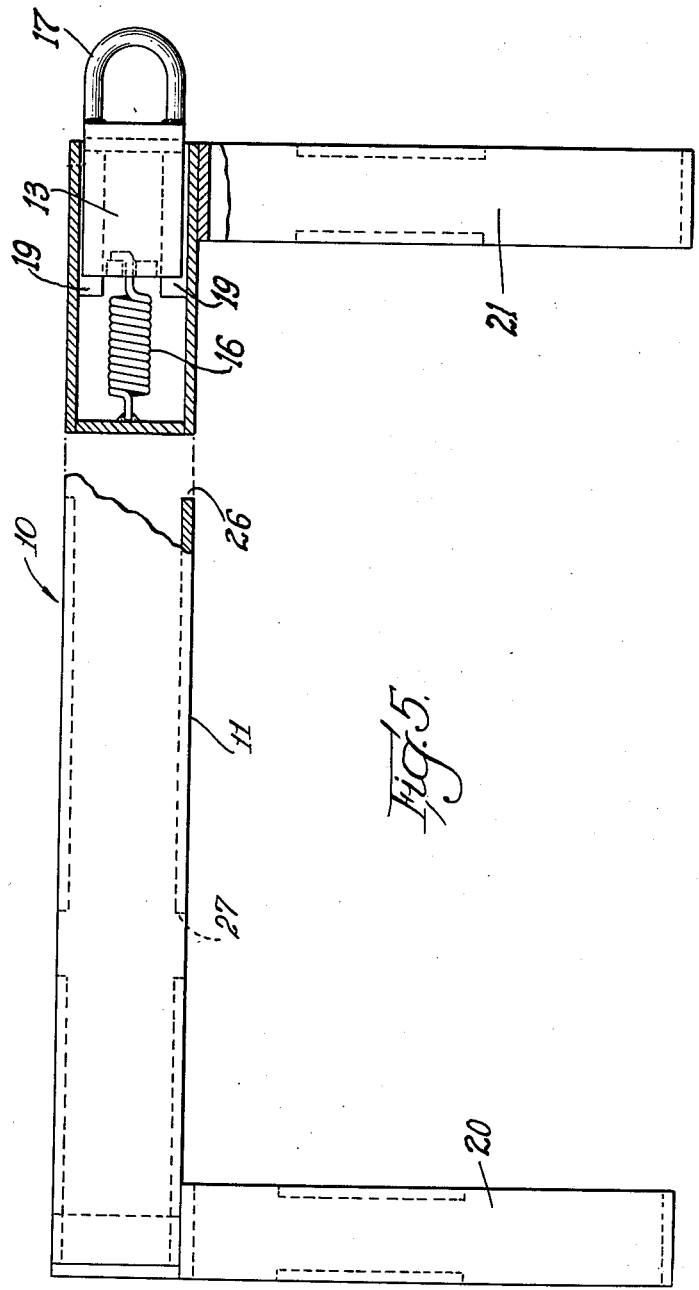

Patented May 18, 1954

2,678,668

UNITED STATES PATENT OFFICE 2,678,668

REEL-LAGGING APPARATUS

Arthur A. Bureau, Chicago, and Frank E. Kimmel, North Riverside, Ill., assignors to Western Electric Company, Incorporated, New York, N. Y., a corporation of New York Application July 23, 1952, Serial No. 300,556

5 Claims. (Cl. 144—25)

This invention relates to reel-lagging apparatus, and has for an object thereof the provision of new and improved apparatus for lagging reels.

Another object of the invention is to provide a reel-lagging apparatus in which a band-holder detachably secured to a reel raises the reel gradually a distance approximately equal to the thickness of lags being applied to a reel.

An apparatus illustrating certain features of the invention may include a band-holder which is securable detachably to a reel and which raises the reel gradually off supporting elements as lags on the reel are brought to the supporting elements.

A complete understanding of the invention may be obtained from the following detailed description of a reel-lagging apparatus forming a specific embodiment thereof, when read in conjunction with the appended drawings, in which Fig. 1 is a front elevation of a reel-lagging apparatus forming a specific embodiment of the invention;

Fig. 2 is a side elevation of the apparatus shown in Fig. 1;

Fig. 3 is a vertical view taken along line 3—3 of Fig. 2;

Fig. 4 is a section taken along line 4—4 of Fig. 2; and

Fig. 5 is a plan view in partial section of the portion of the apparatus shown in Figs. 3 and 4.

Referring now in detail to the drawings, there is shown in Figs. 3, 4 and 5 a holder 10, which includes a channel 11, a hook 12 secured rigidly to the channel and a hook 13 slidably secured to the channel. The hooks 12 and 13 are designed to catch flanges 14 and 15 of the heads of a reel 18 to secure the channel 11 to the reel and prevent the channel from sliding along the flanges. A spring 16 secured to the hook 13 at one end and the channel at its other end serves to hold the hook 13 tightly against the flange 15. A handle 17 may be actuated manually to pull the hook 13 along guideways 19 to remove the holder from the reel and to place the holder on the reel.

Arcuate wedges 20 and 21 secured rigidly to the channel 11 which is of substantially the same in thickness as the lags 22, are designed to rest on the reel flanges 14 and 15, respectively, and raise the reel gradually, as the reel is rotated on rolls 24, which may be driven if desired, thereby avoiding shock as the holder 10 comes to the rolls. Bands 23 for holding lags 22 are looped around the channel 11 at notches 26 therein, and then are fastened in these loops by tie bands 30. The bands 23 are supplied from a supply stand 31 (Fig. 1) and the lags are placed under the bands 23 as the bands 23 close thereon. After the reel is substantially covered by the lags, the bands 23 are severed near the holder 10, the holder is removed from the reel, more lags are substituted for the holder, the end portions of the bands 23 are fastened to the portions of the bands 23 360° therefrom, and the bands are severed to complete the lagging of the reel, which then may be removed from the rolls 24. Another reel then may be lagged.

The above-described apparatus surely and expeditiously lags reels, and is simple and inexpensive in construction and operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A reel-lagging apparatus, which comprises a plurality of rolls for supporting heads of a reel to be lagged, a bar to which bands may be secured, said bar being securable to opposite reel heads of the reel, and a pair of arcuate wedges secured to the bar in positions extending transversely of the bar for engaging the heads of a reel to lift the reel gradually off the rolls onto the bar.

2. A reel-lagging apparatus, which comprises a pair of rolls for supporting heads of a reel thereon, a bar substantially as thick as lags to be applied to the reel, quick-detachable means for securing the bar to the opposite heads of the reel in a position resting on the peripheries of the heads, and a pair of arcuate wedges secured to one edge of the bar in positions extending laterally from one side of the bar and designed to rest on the peripheries of the reel heads for engaging the rolls in advance of the bar to prevent shocks as the bar is rolled onto the rolls.

3. A reel-lagging apparatus, which comprises a pair of rolls for supporting heads of a reel thereon, a channel designed to span the heads of the reel and rest on flanges thereof, said channel having a hook at one end for engaging a peripheral flange of one reel head and a guideway at the other end thereof and also being provided with notches in the flanges thereof for receiving bands, a hook mounted slidably in the guideway for engaging a peripheral flange of the other reel head, means connecting the second hook to the channel for locking the channel to the reel, and a pair of arcuate wedges extending transversely of the channel and partially around the reel heads from one side of the channel in positions designed to rest on the flanges of the reel heads for lifting the reel gradually from the rolls as the channel is advanced to the rolls.

4. A band-holder, which comprises a bar designed to span a reel, quick-detachable means for securing the bar to a reel, and a pair of arcuate wedges secured to the bar in positions designed to engage the peripheries of heads of the reel and extending laterally from the bar partly around the heads of the reel.

5. A band-holder, which comprises a channel for spanning the heads of a reel and having band-receiving notches in the flanges thereof, a hook secured to one end of the channel for hooking under a flange of one reel head, a second hook mounted slidably on the other end of the channel for hooking under a flange of the other reel head, said channel being provided with a guideway for guiding the second hook therealong, a spring urging the second hook toward the first hook, and a pair of arcuate wedges extending laterally from the channel secured to the channel in positions such that the wedges rest on and extend along the flanges of the reel heads when the channel is secured to the reel.

References Cited in the file of this patent

UNITED STATES PATENTS

| Number | Name | Date |
| --- | --- | --- |
| 1,717,834 | Bureau | June 18, 1929 |
| 1,883,011 | Shewmon et al. | Oct. 18, 1932 |